(12) United States Patent
Thiele et al.

(10) Patent No.: US 9,625,336 B2
(45) Date of Patent: Apr. 18, 2017

(54) PRESSURE SENSOR AND METHOD FOR PRODUCING A PRESSURE SENSOR

(75) Inventors: Peter Thiele, Berlin (DE); Christian Wohlgemuth, Berlin (DE)

(73) Assignee: EPCOS AG, Munich (DE)

( * ) Notice: Subject to any disclaimer, the term of this patent is extended or adjusted under 35 U.S.C. 154(b) by 218 days.

(21) Appl. No.: 14/122,231

(22) PCT Filed: May 10, 2012

(86) PCT No.: PCT/EP2012/058667
§ 371 (c)(1),
(2), (4) Date: Apr. 14, 2014

(87) PCT Pub. No.: WO2012/163650
PCT Pub. Date: Dec. 6, 2012

(65) Prior Publication Data
US 2014/0216163 A1    Aug. 7, 2014

(30) Foreign Application Priority Data
May 30, 2011   (DE) .................. 10 2011 102 837

(51) Int. Cl.
*G01L 9/00* (2006.01)
*G01L 19/00* (2006.01)
(Continued)

(52) U.S. Cl.
CPC .......... *G01L 9/0001* (2013.01); *B23K 1/0004* (2013.01); *B23K 11/0026* (2013.01);
(Continued)

(58) Field of Classification Search
CPC .. G01L 19/0645; G01L 19/0046; G01L 7/022
See application file for complete search history.

(56) References Cited

U.S. PATENT DOCUMENTS

| 3,559,488 A | 2/1971 | Weaver |
| 4,072,058 A | 2/1978 | Whitehead, Jr. |

(Continued)

FOREIGN PATENT DOCUMENTS

| CN | 1664527 A | 9/2005 |
| CN | 1814394 A | 8/2006 |

(Continued)

OTHER PUBLICATIONS

"Deltabar S/PMD75", N.N.: Produktkatalog 2007; Endress + Hauser Messtechnik GbmH Co. KG.
(Continued)

*Primary Examiner* — Paul West
(74) *Attorney, Agent, or Firm* — McDermott Will & Emery LLP

(57) ABSTRACT

A pressure sensor (1) is specified, comprising a housing (2), a membrane (3), which forms with the housing (2) a chamber (4) closed off toward the outside, and a filling opening (6) for filling the chamber (4) with a fluid medium (5). The filling opening (6) is closed by means of a soldering or welding closure (7, 8). Furthermore, a method for producing a pressure sensor (1) is specified, wherein a housing (2), which together with a membrane (3) forms a chamber (4), is provided, the chamber (4) is filled with a fluid medium (5) through a filling opening (6), and the filling opening (6) is subsequently closed by means of soldering or welding.

13 Claims, 2 Drawing Sheets

Figure 1:
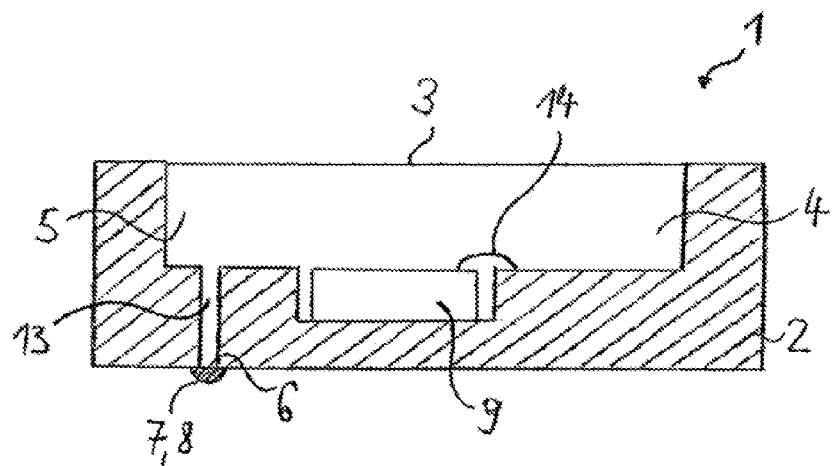

(51) Int. Cl.
*G01L 7/02* (2006.01)
*G01L 19/06* (2006.01)
*B23K 1/00* (2006.01)
*B23K 11/00* (2006.01)

(52) U.S. Cl.
CPC .......... *G01L 7/022* (2013.01); *G01L 19/0046* (2013.01); *G01L 19/0645* (2013.01); *Y10T 29/49002* (2015.01)

(56) References Cited

U.S. PATENT DOCUMENTS

| | | | |
|---|---|---|---|
| 4,218,925 A | 8/1980 | DiDomizio, Jr. | |
| 5,595,939 A * | 1/1997 | Otake | G01L 19/0038 438/51 |
| 5,847,282 A | 12/1998 | Keller | |
| 6,550,337 B1 | 4/2003 | Wagner et al. | |
| 7,677,106 B1 * | 3/2010 | Dowalo | G01L 9/0033 73/714 |
| 2001/0015105 A1 * | 8/2001 | Gerst | G01L 9/0075 73/715 |
| 2002/0005072 A1 * | 1/2002 | Nidan | G01L 9/0054 73/715 |
| 2006/0053896 A1 * | 3/2006 | Suzuki | G01L 19/0645 73/756 |
| 2006/0231148 A1 * | 10/2006 | Watanabe | F15C 1/04 137/828 |

FOREIGN PATENT DOCUMENTS

| | | |
|---|---|---|
| DE | 29502825 U1 | 6/1996 |
| DE | 102005018685 A1 | 11/2006 |
| JP | 01296121 | 11/1989 |
| JP | H01311234 | 12/1989 |
| JP | 10082707 | 3/1998 |
| JP | 11067950 A * | 3/1999 |
| JP | 11153500 | 6/1999 |
| JP | 2001527210 A | 12/2001 |
| JP | 2004309329 A | 11/2004 |
| JP | 2005337970 A | 12/2005 |
| JP | 2007017223 A | 1/2007 |
| WO | 2004/053449 A1 | 6/2004 |

OTHER PUBLICATIONS

Kaden, G.: "Das Packaging, der Schlüssel für die praktische Nutzung des piezoresistiven Effektes (Packaging, the Key for Practical Use of Piezoresistive Effect)", Technisches Messen, 72 (2005) 12, Oldenbourg-Verlag, Dec. 2005 (Abstract).

Wohlgemuth, et al.: "Mikrogehauste mediengetrennte Silizium-Druck-und Differenzdrucksensoren für industrielle Anwendungen", Technisches Messen, 71 (2005) 11, Oldenbourg-Verlag, Sep. 2005, pp. 1-14.

"Piezoresistive Drucktransmitter Serie 23 S / 25 S", N.N.: Produktkatalog 2003; Keller AG für Druckmesstechnik, Winterthur 2003.

* cited by examiner

PRESSURE SENSOR AND METHOD FOR PRODUCING A PRESSURE SENSOR

A pressure sensor comprising a housing filled with a fluid medium is specified. Furthermore, a method for producing a pressure sensor is specified.

Pressure sensors are known from the U.S. Pat. No. 3,559,488.

Known pressure sensors filled with transmitting media require a closure for a filling opening via which the transmitting medium is introduced. The closure has to have a hermetic impermeability with long-term stability for operation and is usually implemented by press-fitting metal balls or metal pins in fitting systems.

One problem addressed by at least some embodiments is that of specifying a pressure sensor. A further problem addressed by at least some embodiments is that of specifying a method for producing a pressure sensor.

These problems are solved by the subject-matters of the independent patent claims. Advantageous embodiments and developments of the subjects are furthermore evident from the following description and the drawings.

A pressure sensor in accordance with at least one embodiment comprises a housing. Furthermore, the pressure sensor comprises a membrane, which is preferably fixed to the housing. The membrane can be connected to the housing by welding or soldering, for example. Preferably, the membrane comprises a metal or consists of metal. The membrane can be composed of high-grade steel, for example. Alternatively, the membrane can also comprise plastic or glass. In this case, the membrane can, for example, also be adhesively bonded to the housing.

In accordance with a further embodiment, the membrane forms with the housing a chamber closed off toward the outside or a cavity closed off toward the outside. The chamber is preferably filled with a fluid medium. The fluid medium is preferably an inert, electrically nonconductive liquid. The fluid medium can be for example an oil, for example silicone oil or almond oil. Here and hereinafter, the fluid medium can also be designated as transmitting medium, as filling medium or as transfer medium or transfer liquid.

In accordance with a further embodiment, a sensor element is arranged in the chamber. The sensor element serves for picking up and converting a mechanical measurement variable into an electrical signal. By way of example, the sensor element comprises a piezoresistive silicon chip with a silicon membrane, on which resistance elements are indiffused or introduced by doping. The silicon chip can be mounted on a glass or silicon body, for example. By means of a pressure-dependent deformation of the silicon membrane and deformation-dependent resistance elements applied thereon, an electrical voltage is formed which can be used to carry out a pressure determination.

Preferably, the sensor element is arranged in the chamber in a depression of the housing. The sensor element can be contact-connected by means of bonding wires, for example, which are electrically conductively connected to conductor tracks supplied on the housing.

The pressure sensor described here can be suitable in particular for measuring the absolute pressure or the relative pressure of a medium or for measuring the differential pressure between two media.

In accordance with a further embodiment, the housing comprises a filling opening. The filling opening serves for filling the chamber with the fluid medium. By way of example, a channel connects the filling opening to the chamber, such that the chamber can be filled with the fluid medium through the filling opening via the channel. The housing can have one or a plurality of filling openings and one or a plurality of channels for filling the chamber with the fluid medium. In this case, the channels can be positioned arbitrarily through the housing.

In accordance with a further embodiment, the filling opening is closed by means of a soldering closure. The soldering closure can comprise a metallic solder, for example. By means of the soldering closure, the filling opening or the housing of the pressure sensor can be closed in a hermetically impermeable manner.

In accordance with a further embodiment, the filling opening is closed by means of a welding closure. The welding closure can be produced for example by means of resistance welding, for example resistance projection welding or ring projection welding. With the use of a welding method for closing the filling opening, the result obtained is similar to that obtained when closing the closure by means of soldering. The closure of the filling opening by means of a soldering or welding closure has, in particular, a hermetic impermeability with long-term stability. Furthermore, in contrast to closures with press-fitting systems, the volume of the fluid medium in the housing of the pressure sensor is not changed when the filling opening is closed by means of soldering or welding. Therefore, a hermetically impermeable closure of a medium-filled pressure sensor is made possible without additional pressing of medium volume, which would lead to a disturbing change in the pressure ratios in the housing of the pressure sensor.

Furthermore, in the case of the soldering or welding closure of the filling opening of a pressure sensor described here, it is not necessary to comply with narrow tolerances in the case of fitting systems, such as for example in the case of press-fitting systems or other types of closures on the basis of a force-locking connection. As a result, in the production of a pressure sensor described here, a cost saving can advantageously be achieved since costly production of accurately fitting metal balls, metal pins, etc., is obviated.

In accordance with a further embodiment, the housing comprises ceramic and/or glass and/or plastic and/or metal or consists of one of these materials. In accordance with a further embodiment, the housing is an FR4 housing. In particular, the housing of a pressure sensor described here can comprise one or more of the stated materials in the region of the filling opening.

Various materials or substances from which housings of media-filled pressure sensors are produced are not suitable for press-fitting systems on account of their material properties. Consequently, the conventional closure technology by means of press-fitting systems cannot be employed for many housing materials. This concerns, in particular, housings comprising plastic, ceramic or glass.

In the case of a pressure sensor described here, the number of materials which can be used for the housing is extended compared with known pressure sensors in particular by materials which do not permit press-fitting. By closing the filling opening by means of a soldering or welding closure, media-filled pressure sensors can thus also be closed in a hermetically impermeable manner with a ceramic, plastic, glass or FR4 housing.

In accordance with a further embodiment, the housing has a metal layer in a region around the filling opening. The metal layer can be produced for example by a metal paste which is applied to the housing by means of a screen printing method and is subsequently fired at a temperature of 800 to 900° C., for example. Preferably, the filling opening is surrounded by the metal layer, without being closed thereby. Depending on the choice of housing material, the metal layer can be advantageous for a hermetic welding or soldering closure of the filling opening with long-term stability, for example in the case of a soldering closure with a metal solder.

In accordance with a further embodiment, the filling opening is closed directly by a solder. In this case, the solder closes the filling opening of the housing without an additional closure part being used. The solder can be applied to the housing or on the metal layer for example in the region of the filling opening. In accordance with a further embodiment, the solder and the fluid medium each have a surface tension, wherein the surface tension of the solder is greater than the surface tension of the fluid medium. Preferably, the surface tension of the solder is at least 10 times greater than the surface tension of the fluid medium. In accordance with one particularly preferred embodiment, the surface tension of the solder is between 10 and 50 times inclusive greater than the surface tension of the fluid medium. By way of example, with the use of solder in the form of lead-free tin solder and silicone oil as fluid medium, the surface tension of the tin solder is 25 times that of the silicone oil.

By virtue of the fact that the surface tension of the solder is advantageously greater than the surface tension of the fluid medium, what can be achieved is that excess fluid medium is forced away from the filling opening by the solder and the solidifying solder closes the housing.

In accordance with a further embodiment, the pressure sensor comprises a closure part. The closure part is preferably welded or soldered to the housing in the region around the filling opening. In particular, the closure part can be welded or soldered to the metal layer. The closure part can be embodied as a metal plate, for example. In accordance with one preferred embodiment, concerning the welding closure, in particular, the closure part has one or a plurality of elevations, so-called welding projections, prior to welding to the metal layer. This can involve, for example, a ring-shaped elevation arranged on a side of the closure part. The closure part is arranged for closing the filling opening with the one elevation or the plurality of elevations on the housing or on a metal layer on the housing. During the welding process, the elevation at least partly melts and can form a stable connection with the housing or with the metal layer applied on the housing.

Furthermore, a method for producing a pressure sensor is specified. The pressure sensor which is producible or produced thereby can comprise one or more features of the abovementioned embodiments. The embodiments described below are applicable equally to the pressure sensor and also to the method for producing the pressure sensor.

In accordance with a further embodiment, the housing is evacuated, for example by air being pumped from the chamber and all interspaces and cavities situated in the housing. The chamber is subsequently filled with a fluid medium through a filling opening in the housing, for example via a channel that connects the filling opening to the chamber. The chamber is then closed by the filling opening being closed in a hermetically impermeable manner by means of soldering or welding. As already described further above, the filling opening can be closed directly by a solder or by a closure part being welded or soldered onto the housing or a metal layer applied on the housing.

In accordance with a further embodiment, at least the filling opening is covered during the closing of the chamber with the fluid medium. By way of example, for this purpose the housing can be immersed at least with the filling opening in the fluid medium. In accordance with a further embodiment, the pressure sensor is completely immersed in the fluid medium during the closing of the chamber. By way of example, the pressure sensor, for the purpose of filling with the fluid medium, can be placed into a bowl filled with the fluid medium, for example silicone oil, such that the pressure sensor is immersed at least with the filling opening or preferably completely in the fluid medium and the silicone oil at least partly or completely covers the housing of the pressure sensor and in particular the filling opening. The filling opening can subsequently be closed with wetting by the silicone oil, that is to say as it were in the oil bath, by means of soldering or welding, without the need for the filling opening or the surfaces of the housing that are to be welded or soldered to be cleaned beforehand, that is to say freed of the oil.

This advantageously makes it possible to ensure that no air is included in the chamber during the process of closing the filling opening. This makes it possible to prevent a change in the volume of the chamber during the closure process.

When closing the filling opening directly by means of a solder, the solder can be applied to the housing or to the metal layer for example in the region of the filling opening before the pressure sensor is filled with the fluid medium. Afterward, the pressure sensor, as described above, can be filled with the fluid medium by the housing being immersed in the fluid medium, and the solder can be heated, for example by means of a laser, with wetting by the fluid medium, such that the solder closes the filling opening. Alternatively, the pressure sensor can firstly be filled with the fluid medium and the solder can be applied to the housing during the process of heating in the region of the filling opening wetted, if appropriate, with fluid medium.

The wetting of the filling opening to be closed with the preferably inert filling medium advantageously makes it possible to prevent oxidation of the metal surfaces required for soldering, for example the metal layer.

Further advantages and advantageous embodiments of the presser sensor will become apparent from the embodiments described below in conjunction with FIGS. 1 to 4.

Figure 2:
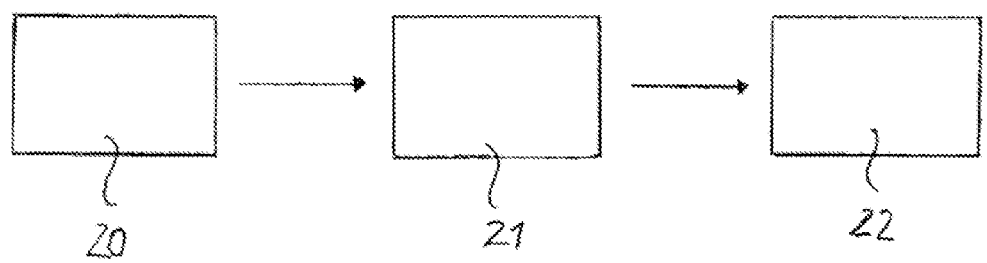
Figure 3:
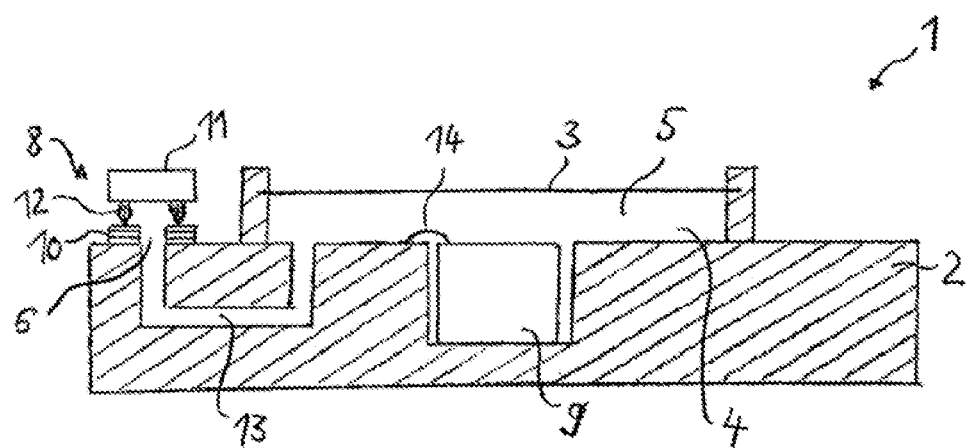
Figure 4:
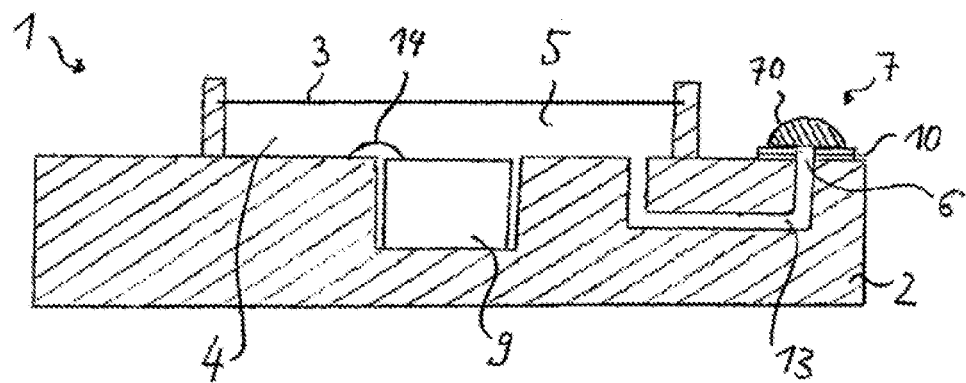

In the figures:

FIG. 1 shows a schematic sectional view of a media-filled pressure sensor in accordance with one exemplary embodiment, FIG. 2 shows a schematic view of a method for producing a pressure sensor in accordance with a further exemplary embodiment, FIG. 3 shows a schematic sectional view of a media-filled pressure sensor in accordance with a further exemplary embodiment, and FIG. 4 shows a schematic sectional view of a media-filled pressure sensor in accordance with a further exemplary embodiment.

In the exemplary embodiments and figures, identical or identically acting component parts may be provided in each case with the same reference signs. The illustrated elements and their size relationships among one another should not be regarded as true to scale, in principle; rather, individual elements such as, for example, layers, components and regions may be illustrated with exaggerated thickness or size dimensions in order to enable better illustration and/or in order to afford a better understanding.

FIG. 1 shows an exemplary embodiment of a pressure sensor 1 in a schematic sectional illustration. The pressure sensor 1 comprises a housing 2, which is embodied as a ceramic housing. Alternatively, the housing 2 can also be embodied as a metal housing, as a glass housing, as a plastic housing or as an FR4 housing, or comprise a combination of the materials mentioned.

The pressure sensor 1 furthermore comprises a membrane 3, which is connected to the housing 2 and forms with the latter a chamber 4 closed off toward the outside. The chamber 4 is filled with a fluid medium 5. The fluid medium 5 is a silicone oil. Alternatively, the fluid medium 5 can also be an almond oil or some other electrically nonconductive liquid suitable for pressure measurements.

The housing 2 comprises a depression, in which a sensor element 9 is arranged. The sensor element 9 comprises a piezoresistive silicon membrane with integrated electrical resistances. When a force acts on the silicon membrane, the latter deforms, as a result of which the resistances connected together to form a Wheatstone bridge, for example, change, as a result of which a pressure determination is now possible. The silicon membrane of the sensor element 9 is produced for example by material removal from a silicon substrate, for example by means of etching.

The sensor element 9 is electrically conductively connected by means of bonding wires 14 to conductor tracks (not shown) arranged on the housing 2. This enables electrical contact to be made with the pressure sensor 1 externally.

Furthermore, the pressure sensor 1 comprises a filling opening 6, which is connected to the chamber 4 via a channel 13. In the exemplary embodiment shown, the filling opening 6 is arranged on that side of the housing 2 which is situated opposite the membrane 3. The pressure sensor 1 comprises a ceramic material in particular in a region of the filling opening 6. The filling opening 6 is closed by means of a soldering closure 7. Alternatively, the filling opening 6 can also be closed by means of a welding closure 8.

As a result of the closure of the filling opening 6 in the form of a soldering or welding closure 7, 8, the housing 2 comprising ceramic, which on account of its material properties is unsuitable for press-fitting systems, for example in the form of press-fitting metal balls or metal pins in fitting systems, can be closed in a hermetically impermeable manner.

Furthermore, the closure of the filling opening 6 in the form of a soldering or welding closure 7, 8 advantageously does not require costly processing of the housing 2 and thus leads, particularly in comparison with housings having fitting systems, to a reduction of costs.

FIG. 2 shows a flow chart of a method for producing a pressure sensor in accordance with a further embodiment. By way of example, the pressure sensor in accordance with the exemplary embodiment in FIG. 1 can be producible by means of the method shown. The following references to features of the pressure sensor therefore refer purely by way of example to the elements in FIG. 1 using the reference signs shown therein.

A first method step 20 involves providing a housing 2, which together with the membrane 3 forms a chamber 4. Preferably, a vacuum is generated in the housing 2, for example by air that is situated in the chamber 4 and/or the channel 13 of the housing 2 being pumped from the housing 2.

Afterward a further method step 21 involves filling the chamber 4 with the fluid medium 5, for example with silicone oil, in a gas-free manner through the filling opening 6. For this purpose, the housing is flooded with the fluid medium, for example by the housing 2 being immersed in the silicone oil. As a result, the entire inner volume of the pressure sensor 1 is filled with the fluid medium 5, such that during later operation of the pressure sensor a pressure exerted on the membrane 3 can be transmitted, in manner as much as possible without falsification, from the membrane 3 via the fluid medium 5, representing the transfer liquid, to the sensor element 9.

A subsequent further method step 22 involves closing the filling opening 6 by means of a soldering method or by means of a welding method. During the closure process, preferably at least the filling opening 6 is covered with the fluid medium 5, that is to say the silicone oil, for example, in order to enable a closure without gas inclusion. The closure is therefore preferably effected by means of a soldering or welding method with so-called oil contamination in the oil bath. However, cleaning of the filling opening 6 to be closed before the closure is advantageously not necessary in the case of the method described here. The closure is hermetically impermeable even after closing in the oil bath.

When the soldering method is employed, a closure is possible by joining a closure part or directly by means of a solder. In this case, an adapted design of the geometries by means of the surface tension of the solder enables the closure of the housing.

In the case of the closure by means of a soldering method, the soldering is preferably effected on a solderable metal layer or metallization, such as a fired thick-film paste, for example, which, if appropriate, is also precoated with solder. In this case, the use of different soldering methods without or with additional solder is possible. In particular, the solder can already be applied before the housing is filled with the fluid medium 5 in the region of the filling opening, and can be heated after the housing has been filled. Alternatively, solder can be applied on the housing in the region of the filling opening after the housing has been filled, during the process of heating.

The surface tension of the liquid solder is preferably greater than the surface tension of the fluid medium 5, such that the excess fluid medium 5 is forced away from the filling opening by the solder and the solidifying solder closes the housing. By way of example, with the use of metallic solder and an organic fluid medium as filling medium, the surface tension of the solder amounts to a multiple of the surface tension of the fluid medium. In this regard, for example with the use of lead-free tin solder and silicone oil as fluid medium, the surface tension of the solder is approximately 25 times that of the oil.

During the closure of the filling opening alternatively by means of a welding method, the metal layer is preferably adapted to the joining method. Fusion takes place for example by melting a ring projection of the closure part in the resistance welding method.

By virtue of the short time of action of the heating during welding and soldering, an expansion of the filling medium can be disregarded.

The method for producing a pressure sensor as described here is distinguished, in particular, by the fact that changes in the volume of the media-filled system of the pressure sensor are minimized and the filling process is thus simplified.

FIG. 3 shows a pressure sensor 1 in a sectional view in accordance with a further exemplary embodiment, wherein the filling opening 6 is closed by means of a welding closure 8. The pressure sensor 1 from FIG. 3 comprises the elements described in connection with FIG. 1: housing 2, membrane 3 and media-filled chamber 4. In contrast to the pressure sensor from FIG. 1 the filling opening 6 is arranged, purely by way of example, on the same side of the housing 2 on which the membrane 3 is fixed to the housing 2. Furthermore, the channel 13 connecting the filling opening 6 to the chamber 4 is embodied in a U-shaped fashion.

A metal layer 10 is arranged on the housing 2. The metal layer 10 is applied to the housing 2 by means of a screen printing method, for example, and is fired at a temperature of between 800 and 900° C., for example. The metal layer is applied on the housing in particular in a region around the filling opening 6, but does not close the latter. A closure part 11, which is embodied as a metal plate, for example, is welded to the metal layer 10.

Prior to welding to the metal layer 10, the closure part 11 has an elevation 12, with which it is arranged on the metal layer 10 before the closure part is connected to the metal layer 10 by means of welding. For the sake of clarity, the elevation 12 is shown in a state prior to welding in FIG. 3. By way of example, the elevation 12 is embodied as a ring-shaped welding projection which is at least partly melted during the welding process and forms a stable connection with the metal layer 10.

FIG. 4 illustrates a sectional view of a pressure sensor 1 in accordance with a further exemplary embodiment. In terms of its basic construction the pressure sensor 1 corresponds to the pressure sensor from FIG. 3. In contrast to the exemplary embodiment illustrated in FIG. 3, the filling opening 6 is closed by means of a soldering closure 7 in the case of the exemplary embodiment in FIG. 4. In this case, a solder 70 applied to the metal layer 10 directly closes the filling opening 6 of the pressure sensor 1. As described above, the surface tension of the solder 70 is preferably greater than the surface tension of the fluid medium 5, for example at least 10 times greater, such that, as described above, excess fluid medium 5 is forced away and the solidifying solder 70 can close the housing.

The invention is not restricted to the exemplary embodiments by the description on the basis of said exemplary embodiments, but rather encompasses any novel feature and also any combination of features. This includes in particular any combination of features in the patent claims, even if this feature or this combination itself is not explicitly specified in the patent claims or exemplary embodiments.

LIST OF REFERENCE SIGNS

1 Pressure sensor
2 Housing
3 Membrane
4 Chamber
5 Fluid medium
6 Filling opening
7 Soldering closure
70 Solder
8 Welding closure
9 Sensor element
10 Metal layer
11 Closure part
12 Elevation
13 Channel
14 Bonding wire
20, 21, 22 Method steps

The invention claimed is:

1. A method for producing a pressure sensor, comprising the following steps:
   providing a housing, which together with a membrane forms a chamber;
   filling the chamber with a fluid medium through a filling opening in the housing; and
   closing the filling opening by soldering or welding,
   wherein
      the filling opening is closed by a closure part,
      the closure part comprises a metal plate,
      the closure part is soldered or welded to the housing in the region around the filling opening,
      the closure part is arranged on the housing but does not protrude into the filling opening such that the volume of the fluid medium inside the housing is not changed when the filling opening is closed,
      the pressure sensor comprises a sensor element,
      the membrane forms an outer side of the pressure sensor such that an outer pressure directly acts on the membrane, and
      the outer pressure is transferred via the fluid medium on the sensor element.

2. The method according to claim 1, wherein the filling opening is covered during the closing of the chamber with the fluid medium.

3. The method according to claim 1 or 2, wherein the pressure sensor is completely immersed in the fluid medium during the closing of the chamber.

4. The method according to claim 1, wherein the filling opening is closed by resistance welding.

5. The method according to claim 1, wherein the closure part is soldered on during the closing of the filling opening.

6. The method according to claim 5, wherein the solder and the fluid medium each have a surface tension, and the surface tension of the solder is greater than the surface tension of the fluid medium.

7. A method for producing a pressure sensor, comprising the following steps:
   providing a housing, which together with a membrane forms a chamber;
   filling the chamber with a fluid medium through a filling opening in the housing; and
   closing the filling opening by soldering or welding,
   wherein
      the filling opening is closed by a closure part,
      the closure part comprises a metal plate,
      the closure part is soldered or welded to the housing in the region around the filling opening,
      the closure part is arranged on the housing but does not protrude into the filling opening such that the volume of the fluid medium inside the housing is not changed when the filling opening is closed,
      the filling opening is closed by resistance welding,
      the housing has a metal layer in the region around the filling opening, and
      for the purpose of closing the filling opening, the closure part having one or a plurality of elevations is arranged with the one or the plurality of elevations on the metal layer and is connected to the metal layer.

8. A pressure sensor, comprising:
   a housing;
   a membrane, which forms with the housing a chamber closed off toward the outside, the chamber being filled with a fluid medium; and
   a filling opening in the housing for filling the chamber with the fluid medium,
   wherein
      the filling opening is closed by a closure part,
      the closure part comprises a metal plate,
      the closure part is soldered or welded to the housing in the region around the filling opening, the closure part is arranged on the housing but does not protrude into the filling opening such that the volume of the fluid medium inside the housing is not changed when the filling opening is closed, the pressure sensor comprises a sensor element, the membrane forms an outer side of the pressure sensor such that an outer pressure directly acts on the membrane, and the outer pressure is transferred via the fluid medium on the sensor element.

9. The pressure sensor according to claim 8, wherein a sensor element is arranged in the chamber.

10. The pressure sensor according to claim 8, wherein the housing comprises one or more of the following materials: ceramic, glass, plastic, metal.

11. The pressure sensor according to claim 8, wherein the housing has a metal layer in a region around the filling opening.

12. The pressure sensor according to claim 11, wherein the closure part is welded or soldered to the metal layer.

13. The pressure sensor according to claim 8, wherein the solder and the fluid medium each have a surface tension, and the surface tension of the solder is greater than the surface tension of the fluid medium.

* * * * *